Dec. 4, 1923.
E. LUEBKE ET AL
1,476,627
HOOK
Filed Dec. 28, 1922
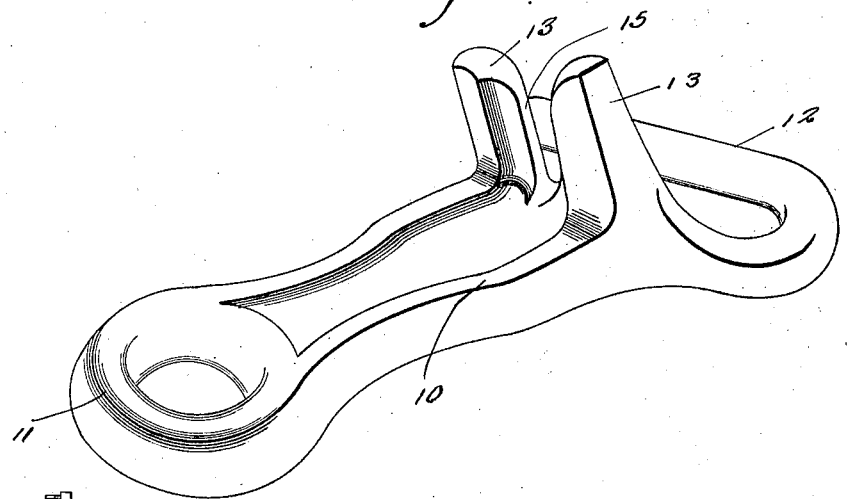
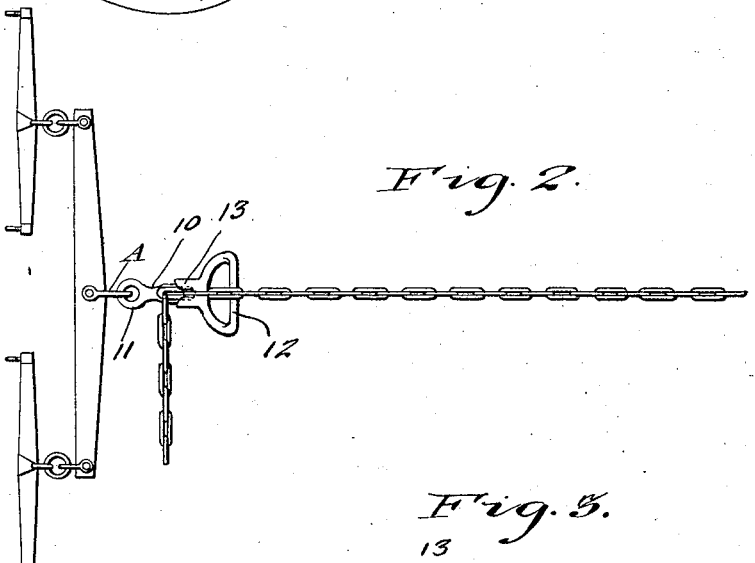
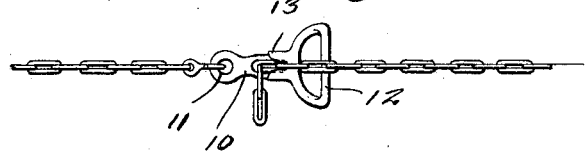
Emil Luebke
Charles Luebke   INVENTOR
BY *Victor J. Evans*
ATTORNEY
WITNESSES Patented Dec. 4, 1923.

1,476,627

UNITED STATES PATENT OFFICE.

EMIL LUEBKE AND CHARLES LUEBKE, OF NEILLSVILLE, WISCONSIN.

HOOK.

Application filed December 28, 1922. Serial No. 609,404.

*To all whom it may concern:*

Be it known that we, EMIL LUEBKE and CHARLES LUEBKE, citizens of the United States, residing at Neillsville, in the county of Clark and State of Wisconsin, have invented new and useful Improvements in Hooks, of which the following is a specification.

This invention relates to connecting or securing devices, particularly to hooks, and has for its object the provision of a novel hook designed for use for a wide variety of purposes such as connecting chains to clevises of different types or for connecting a chain, cable, or other draft element to log chains and the like.

An important object is the provision of a hook of this character which is so constructed that when used for skidding purposes it will always remain upright as it is dragged along so that it will be unnecessary for the operator to grasp the device and turn it over whenever it is desired to engage a chain thereon or disengage it therefrom, another feature of advantage being that the hook will not gather trash while being dragged along.

With the above and other objects and advantages in view, the invention consists in the details of construction to be hereinafter more fully described and claimed and illustrated in the accompanying drawings in which—

Figure 1 is a perspective view of the device.

Figure 2 is a plan view of the device showing it associated with a chain and draft device and Figure 3 is a plan view showing the device associated with two chains and connecting them.

Referring more particularly to the drawings, we have shown the hook as formed from a single casting and including an elongated shank 10 which has its sides curved to reduce weight without sacrificing strength and which has one end formed with an eye 11 adapted for connection with a clevis A, as shown in one of the views, and which is capable of having a cable or chain hook secured therein, depending upon the use to which the device is put and the apparatus with which it is associated. The outer end of this shank terminates in a relatively wide open frame or loop 12 which is designed to act as a handle or hand grip for the operator to grasp when backing the horses, making a turn or the like. This loop is so designed that it carries the grip part about an inch from the ground, making it easy for the operator to grasp it. If desired the loop may be omitted.

Rising from the junctures of the side portions of the shank with the loop or frame 12 and merging thereinto are spaced upstanding horns 13 which define a slot between them and which have their upper adjacent corners curved, as shown at 14, to define a flaring entrance opening 15. These horns constitute a hook for engagement therein of a link of a chain used for many purposes. A cable or chain ring might be dropped over these horns, and the device used in this way.

In Figures 2 and 3 different adaptations or arrangements are disclosed which will reveal the utility of the device. In the use it is quite apparent that it is a very simple matter to engage a chain upon or disengage it from the hook defined by the horns. There is no restriction whatever as to the use of the device as the adaptability and convenience will be readily apparent from an inspection of the drawing so that further explanation will not be necessary.

While we have shown and described the preferred embodiment of the invention it is of course to be understood that we reserve the right to make such changes in the form, construction and arrangement of parts as will not depart from the spirit of the invention or the scope of the subjoined claims.

Having thus described our invention, we claim:

1. A hook of the character described comprising an elongated shank member terminating at one end in an eye and having its other end formed as a loop, and a pair of upstanding horns rising from the juncture of the shank with the side of said loop, said horns being spaced apart to define a slot, and the corners of the horns being curved to define a flaring entrance opening.

2. A hook of the character described comprising an elongated shank terminating at one end in an eye and having its other end formed as a laterally elongated loop, and a pair of upstanding horns rising from the juncture of the shank with the loop, said horns being spaced apart to define a slot.

In testimony whereof we affix our signatures.

EMIL LUEBKE.
CHARLES LUEBKE.